United States Patent [19]
Muller et al.

[11] Patent Number: 5,252,881
[45] Date of Patent: Oct. 12, 1993

[54] MICRO MOTORS AND METHOD FOR THEIR FABRICATION

[75] Inventors: Richard S. Muller, Kensington; Longsheng Fan, Berkeley; Yu C. Tai, Albany, all of Calif.

[73] Assignee: The Regents of the University of California, Berkeley, Calif.

[21] Appl. No.: 284,084

[22] Filed: Dec. 14, 1988

[51] Int. Cl.$^5$ .............................................. H02N 1/00
[52] U.S. Cl. ............................. 310/309; 310/40 MM; 310/42; 310/90; 310/268
[58] Field of Search ............... 310/40 MM, 49 R, 90, 310/162-164, 269, 261, 254, 42, 309, 268, DIG. 6

[56] References Cited

U.S. PATENT DOCUMENTS

| | | | |
|---|---|---|---|
| 4,009,406 | 2/1977 | Inariba | 310/164 |
| 4,075,518 | 2/1978 | Koehler | 310/49 R |
| 4,206,374 | 6/1980 | Goddijn | 310/162 |
| 4,647,803 | 3/1987 | von der Heide | 310/90 |
| 4,740,410 | 4/1988 | Muller | 310/309 UX |
| 4,754,185 | 6/1988 | Gabriel et al. | 310/309 |
| 4,943,750 | 7/1990 | Howe et al. | 310/42 |

FOREIGN PATENT DOCUMENTS

| | | | |
|---|---|---|---|
| 0020156 | 2/1982 | Japan | 310/DIG. 6 |
| 0136979 | 6/1988 | Japan . | |
| 0136980 | 6/1988 | Japan . | |

OTHER PUBLICATIONS

Long-Sheng Fan, et al., *Pin Joints, Gears, Springs, Cranks, and Other Novel Micromechanical Structures*, pp. 849-852, "Transducers '87," 4th Int'l. Conf. on Solid-State Sensors and Actuators, Jun. 2-5, 1987.

"Micromachine" by R. Gannon; Popular Science; pp. 87-92, 143; Mar., 1989.

"Silicon Electrostatic Motor" by W. S. N. Trimmer et al.; Transducers Jun. 1987; Att. Bell Lab's Holmdel, N.J.

*Primary Examiner*—R. Skudy
*Attorney, Agent, or Firm*—Heller, Ehrman, White & McAuliffe

[57] ABSTRACT

A method for making and the product resulting from the method for making a microminiature electrical motor having a rotor rotatable about a fixed hub member within a surrounding stator, the diameter of the stator being typically in the range of 60-140 microns. Both synchronous and stepper motor configurations are described, each with structural features that provide increased performance and minimal rotor friction. The processes disclosed for making the micro-motors include the steps of: providing a substrate material with a first layer of silicon dioxide covered by an overlayer of silicon nitride; providing a first layer of sacrificial material on said substrate; providing a first structural layer over said sacrificial material; providing patterning and then etching said first structural layer to form said rotor and stator components; providing a second layer of sacrificial material over said first structural layer and patterning it to form an anchor opening in said substrate at the center of the rotor; providing a second structural layer to form a hub member in said anchor opening and patterning said second structural layer to form a flange for said hub member; and etching said sacrificial layers to separate said rotor and stator components and said rotor from said hub member so that it rotates about it. The invention also includes an ancillary method for protecting metallized elements in the motor circuit during the required etching steps for removal of sacrificial layers.

10 Claims, 12 Drawing Sheets

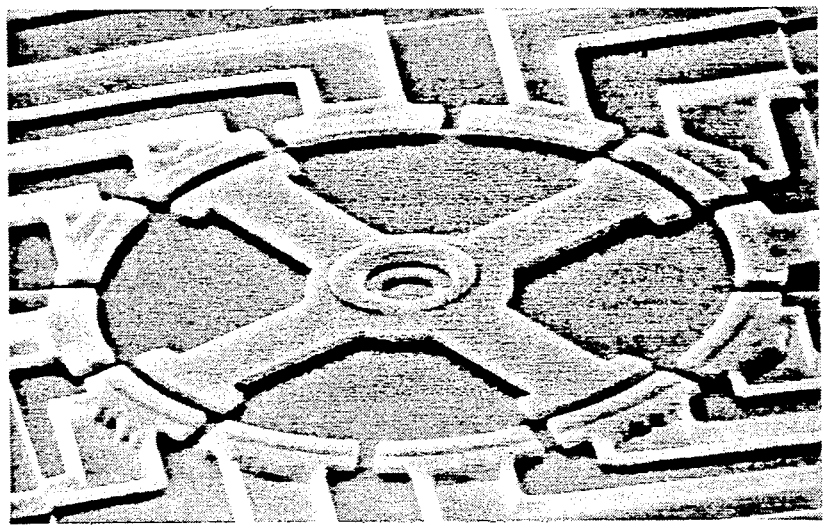
FIG._1
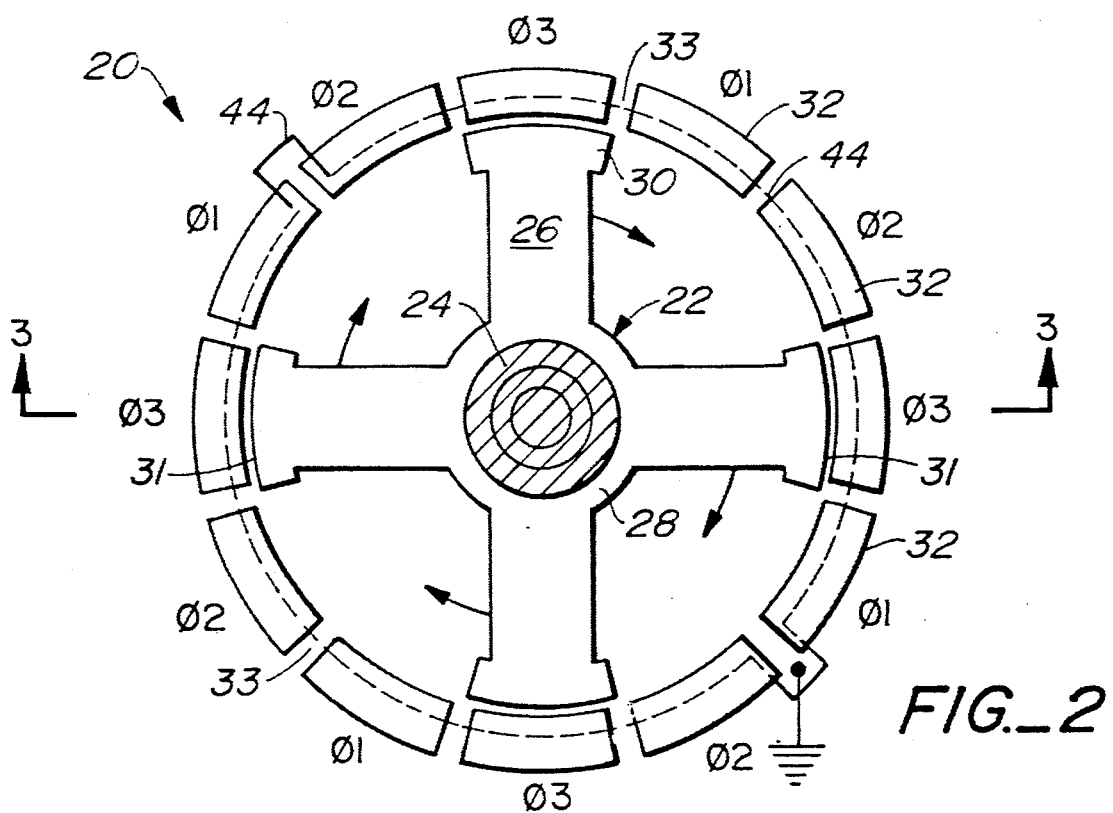
FIG._2

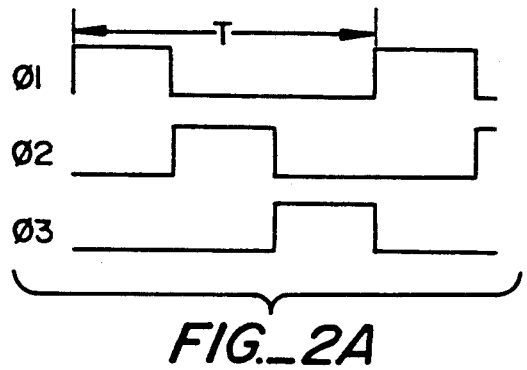
FIG._2A
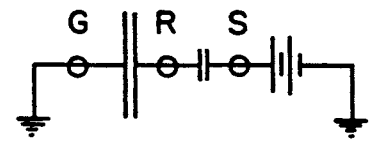
FIG._3A
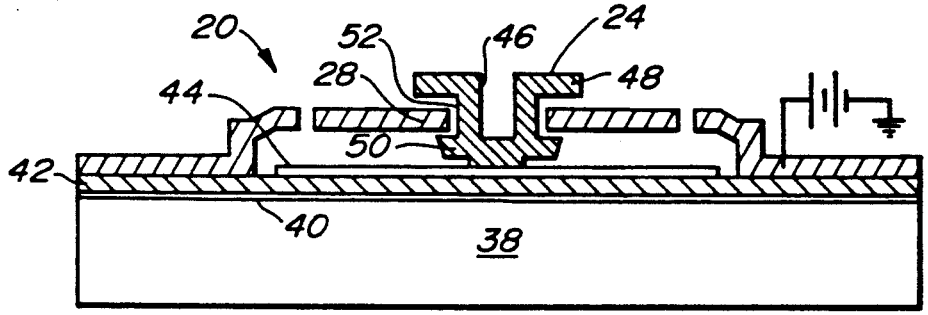
FIG._3
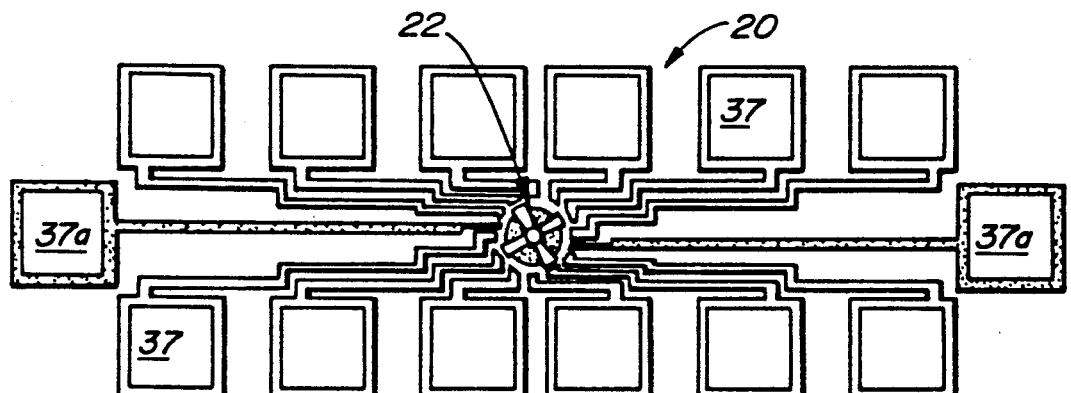
FIG._4

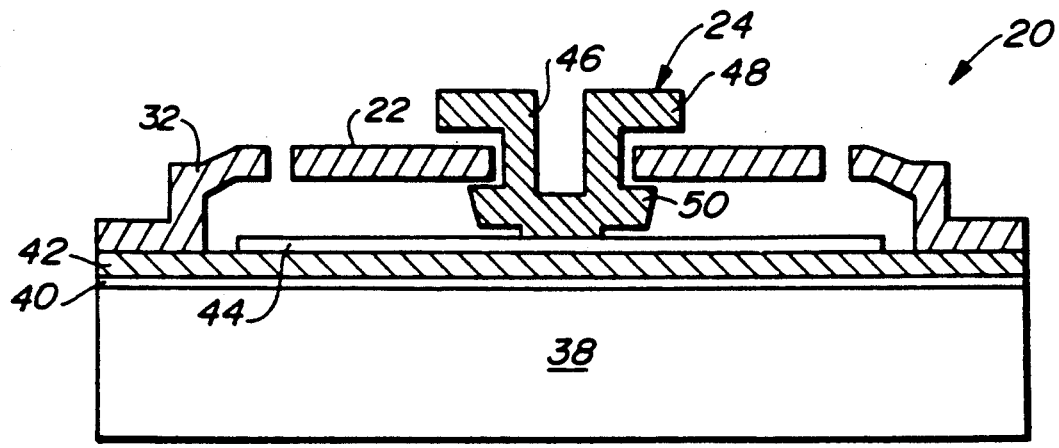
*FIG._5A*
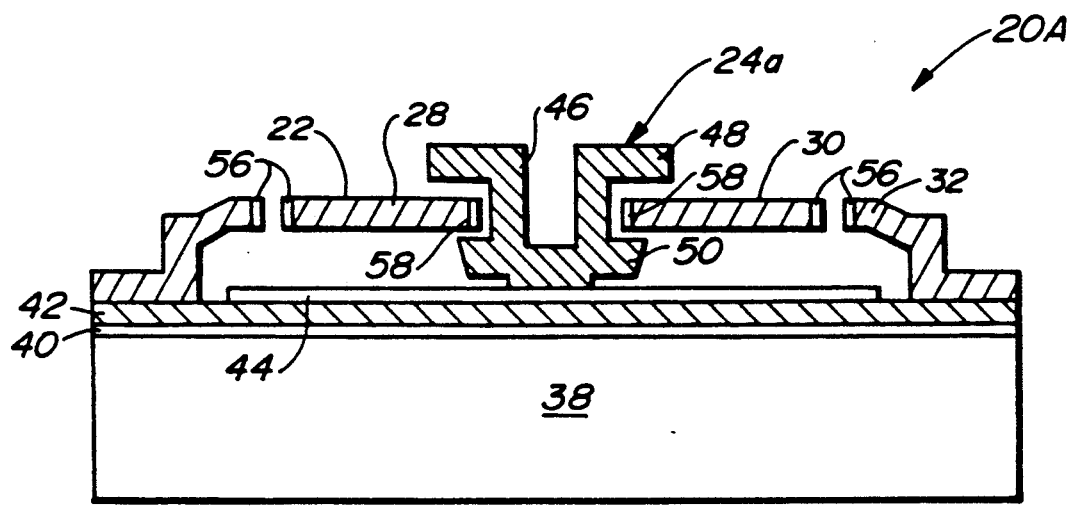
*FIG._5B*
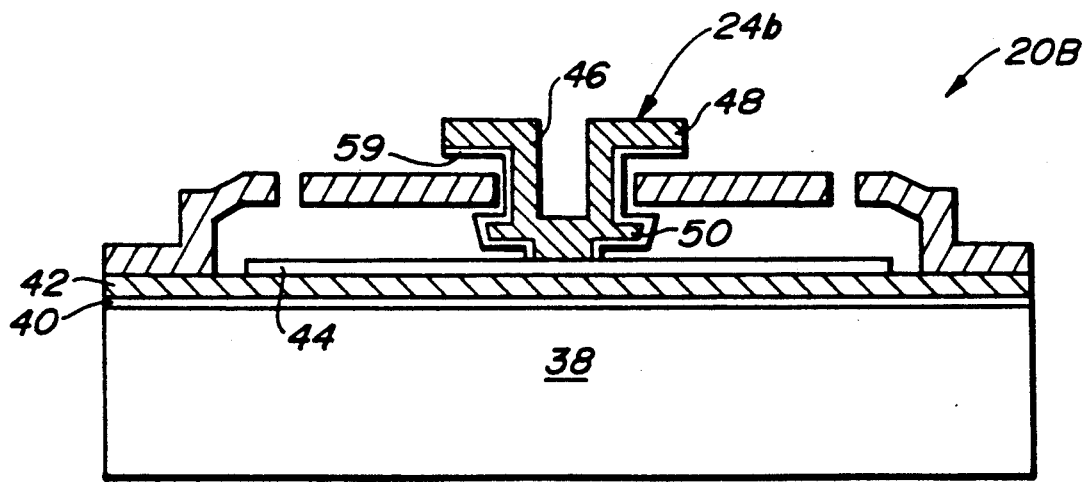
*FIG._5C*

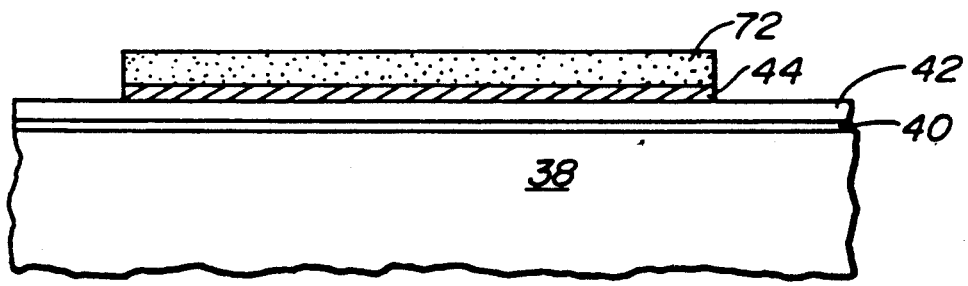
FIG._6A
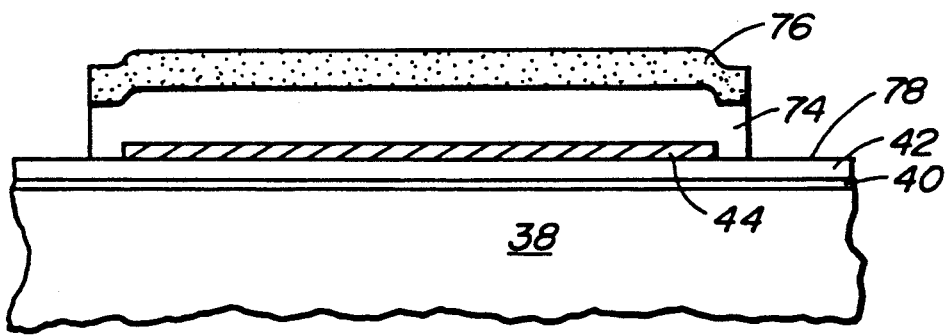
FIG._6B
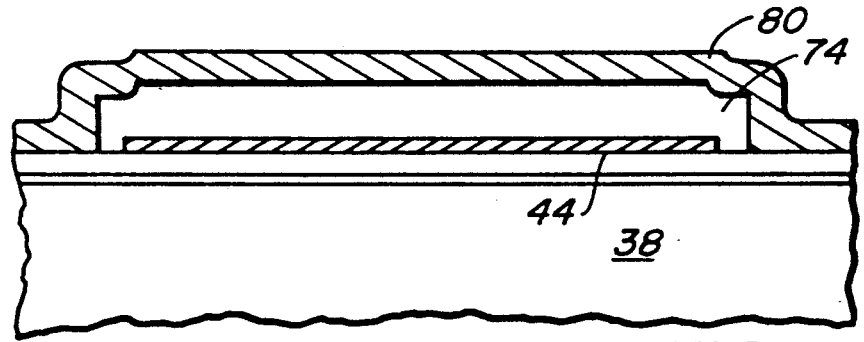
FIG._6C
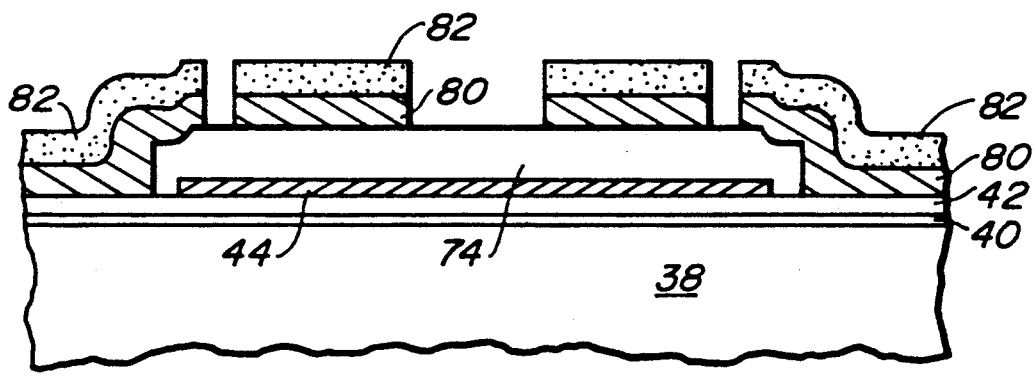
FIG._6D

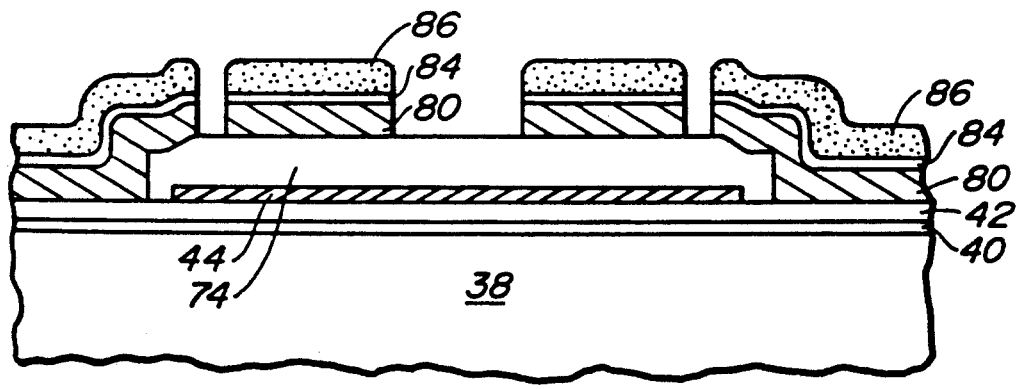
FIG._6E
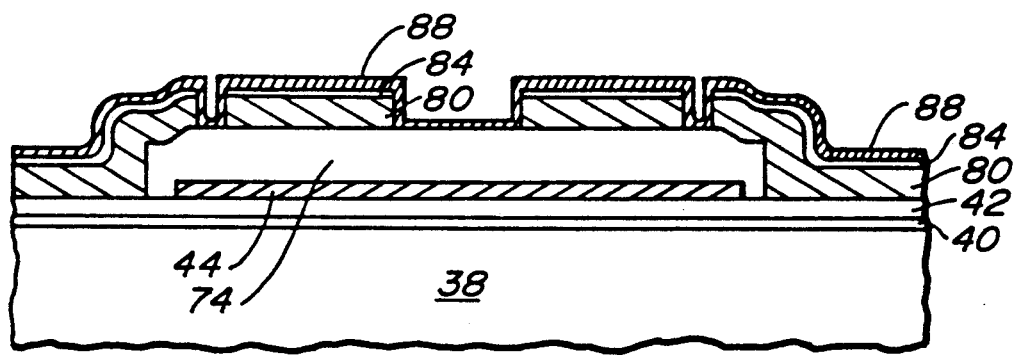
FIG._6F
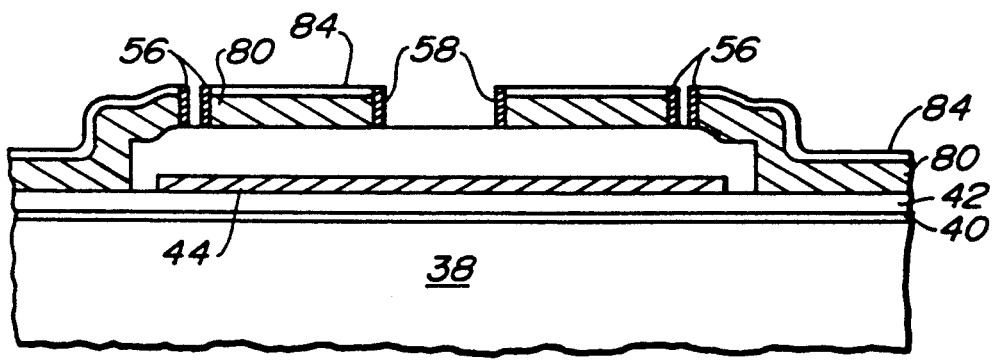
FIG._6G
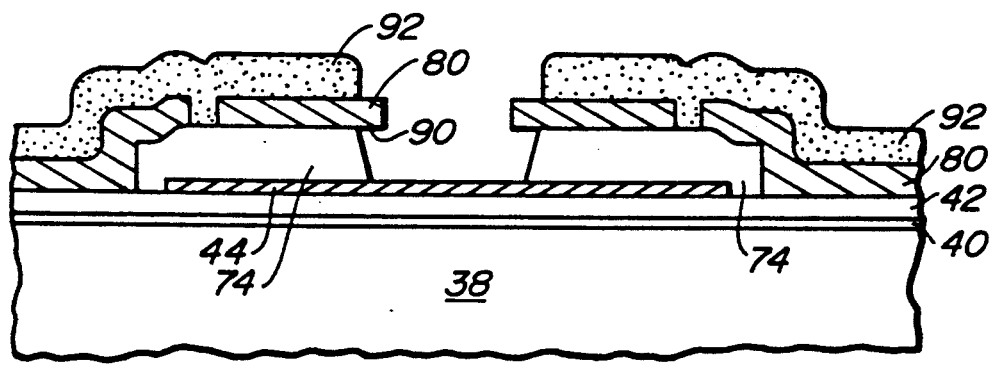
FIG._6H

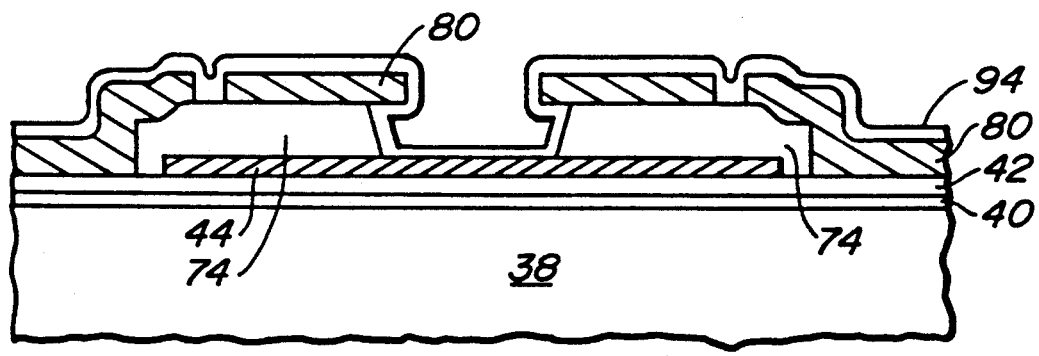
FIG._6I
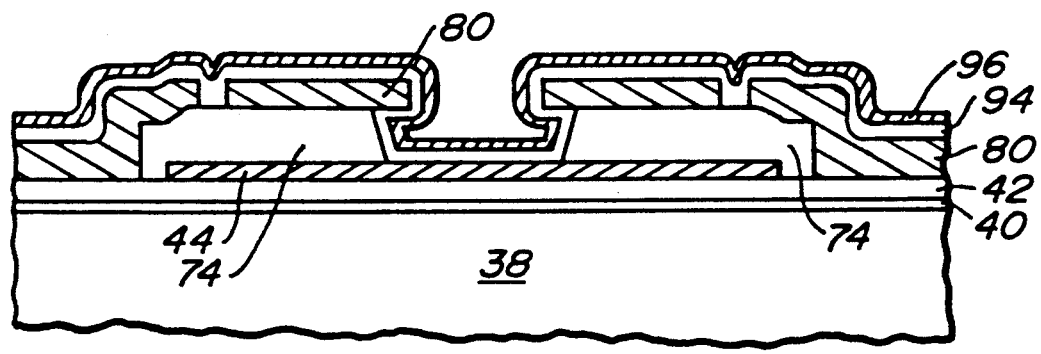
FIG._6J
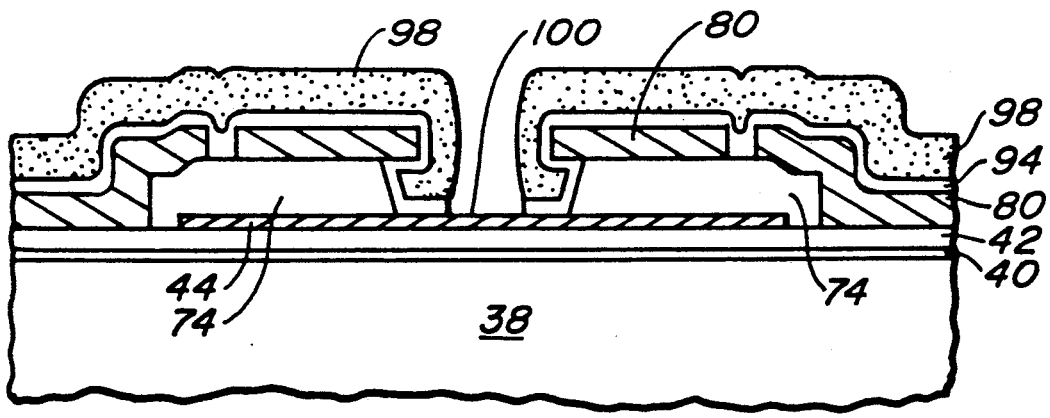
FIG._6K

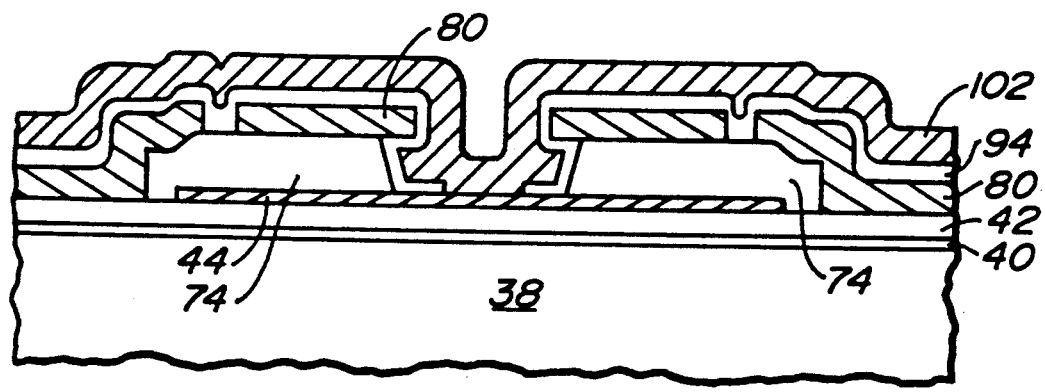
FIG._6L
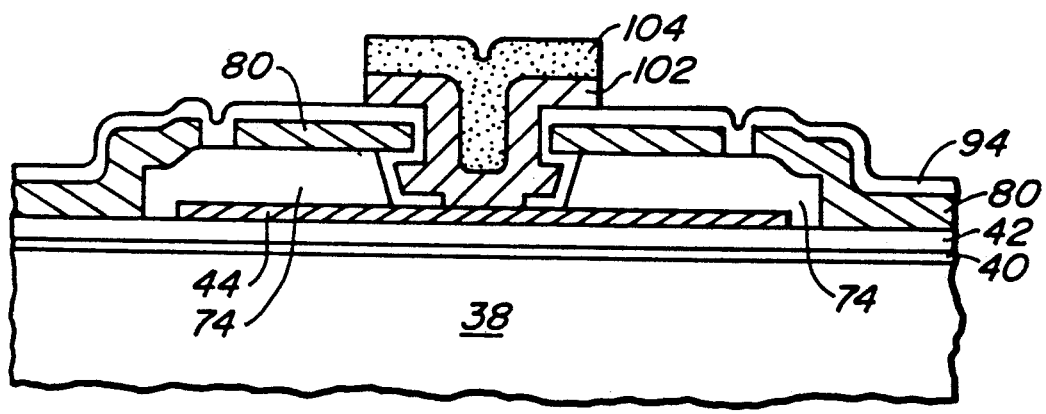
FIG._6M
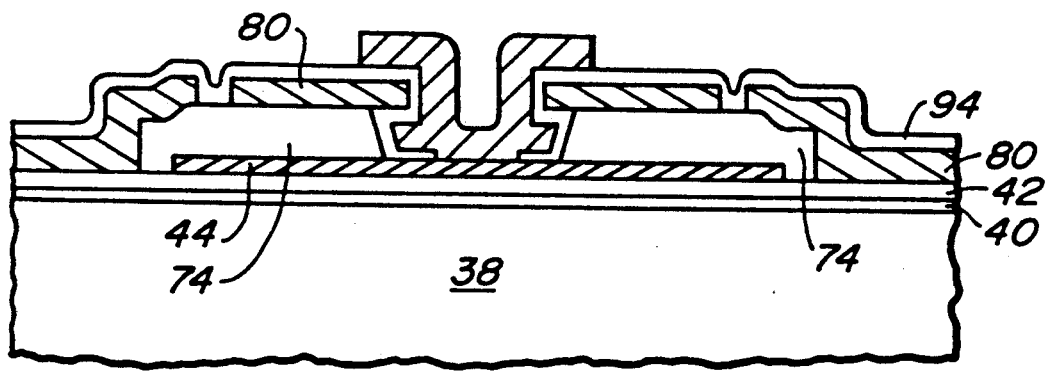
FIG._6N

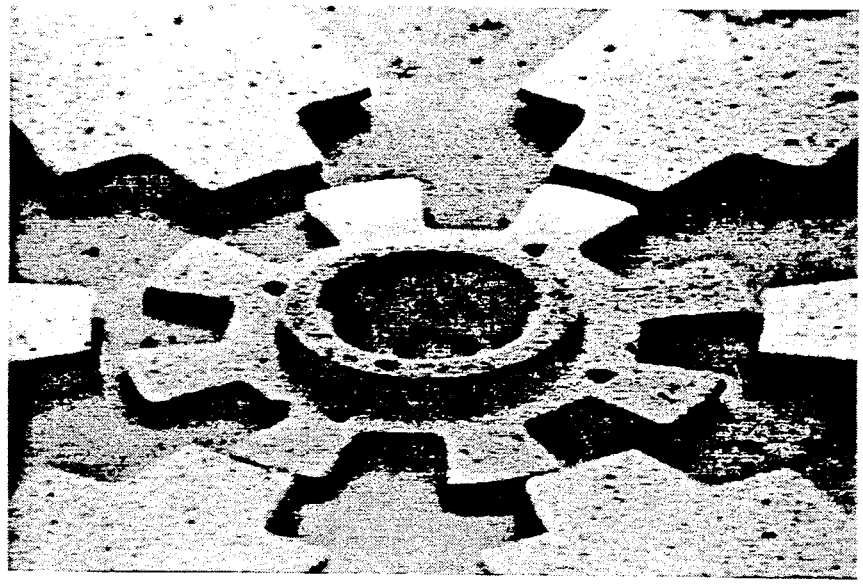
FIG._7
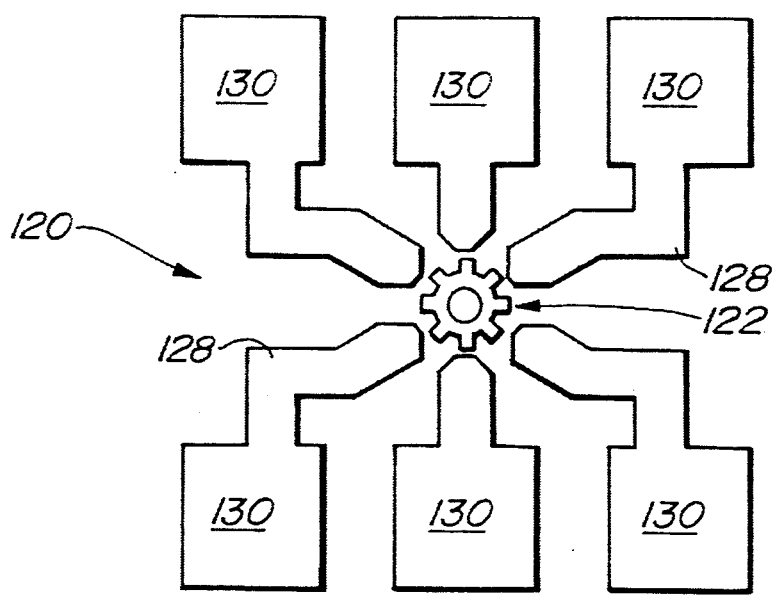
FIG._8

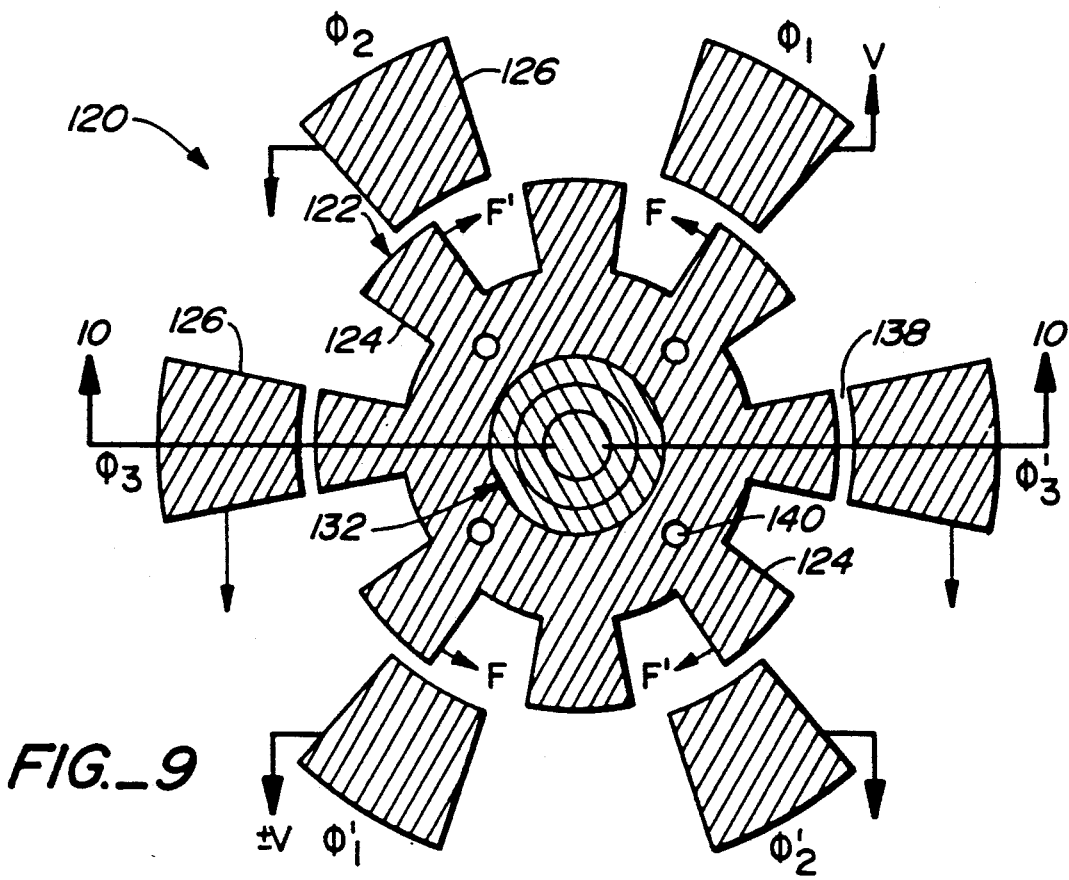
FIG._9
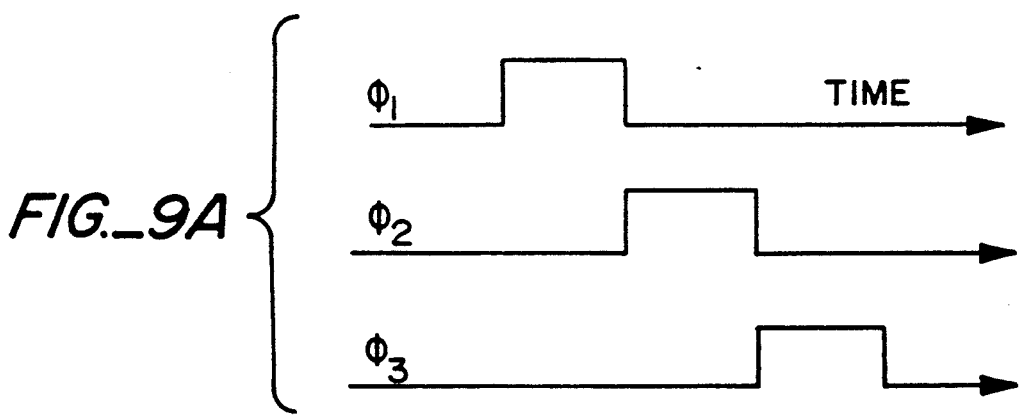
FIG._9A
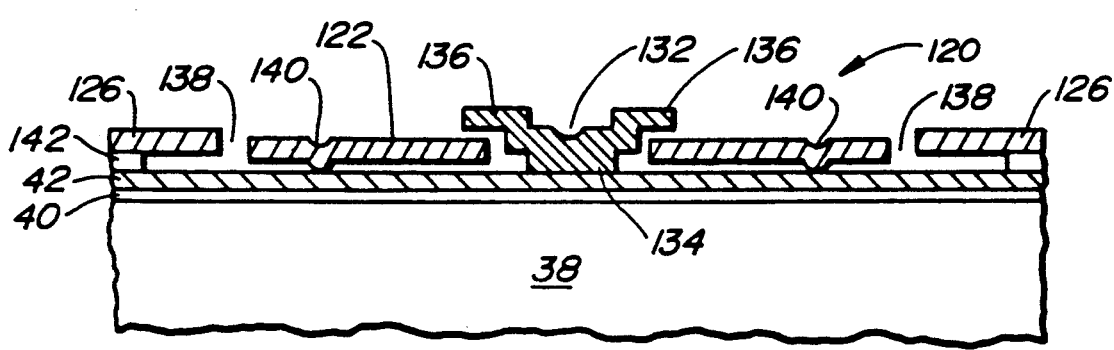
FIG._10

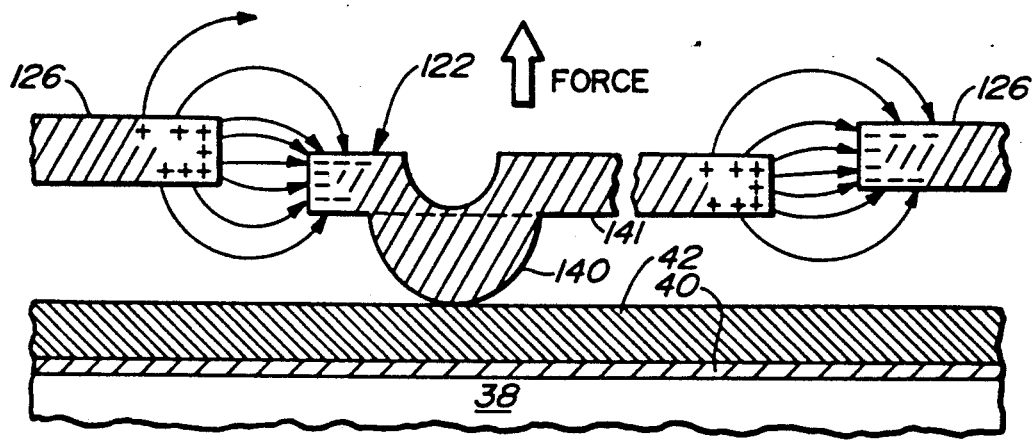
FIG._10A
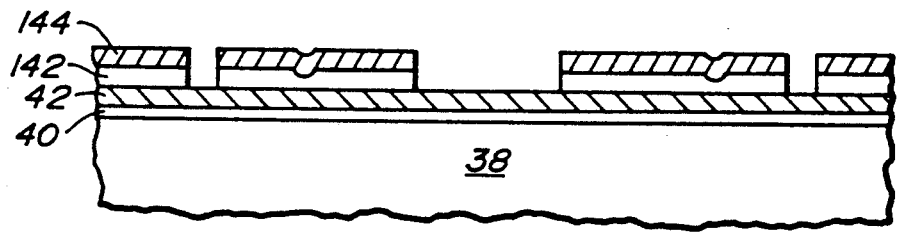
FIG._11A
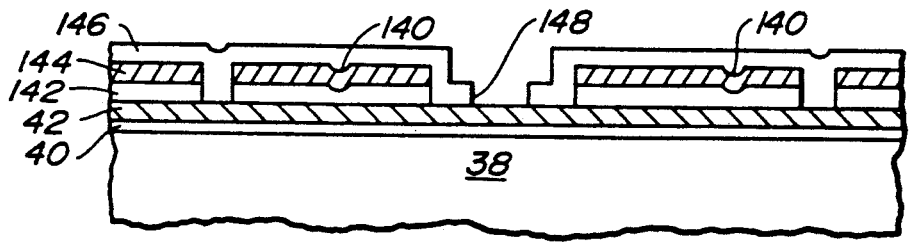
FIG._11B
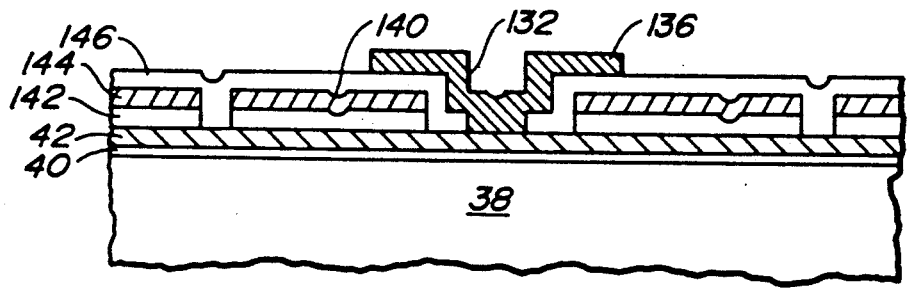
FIG._11C

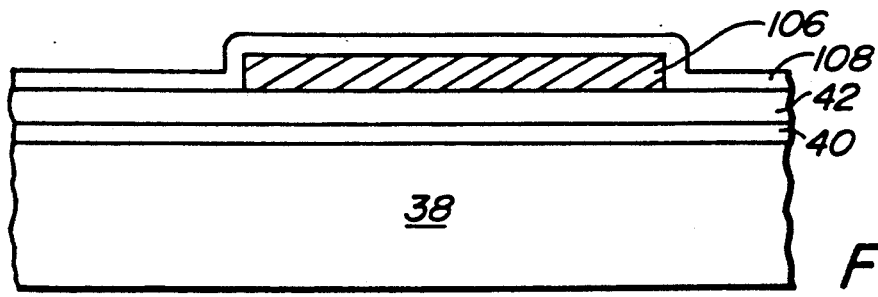
FIG._12A
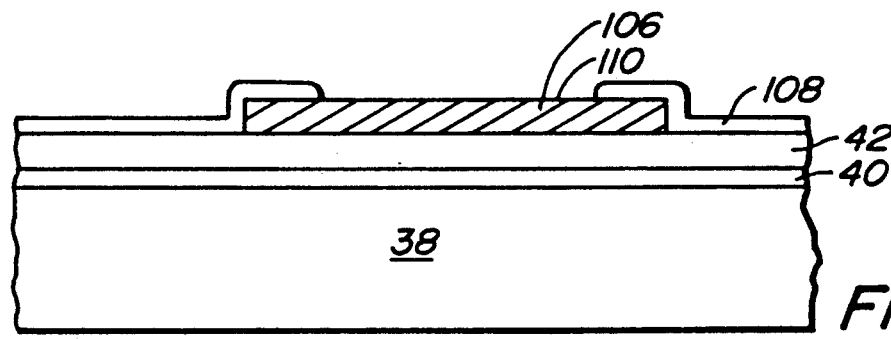
FIG._12B
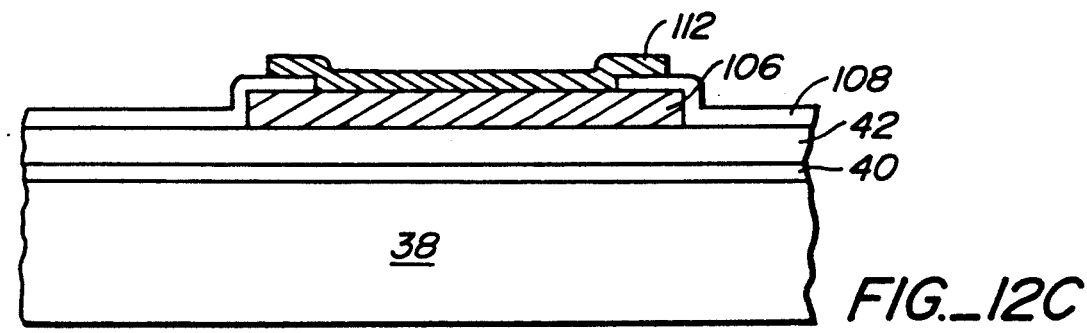
FIG._12C
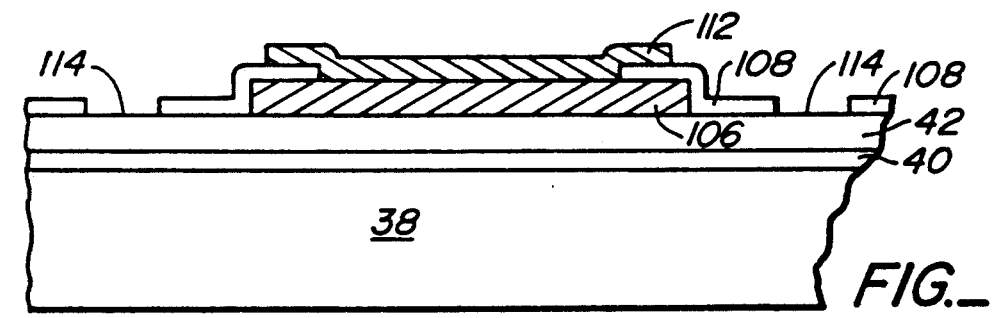
FIG._12D
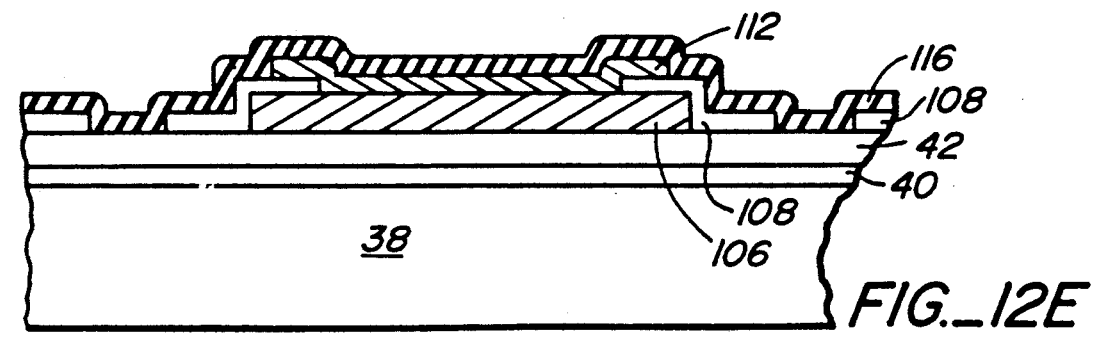
FIG._12E

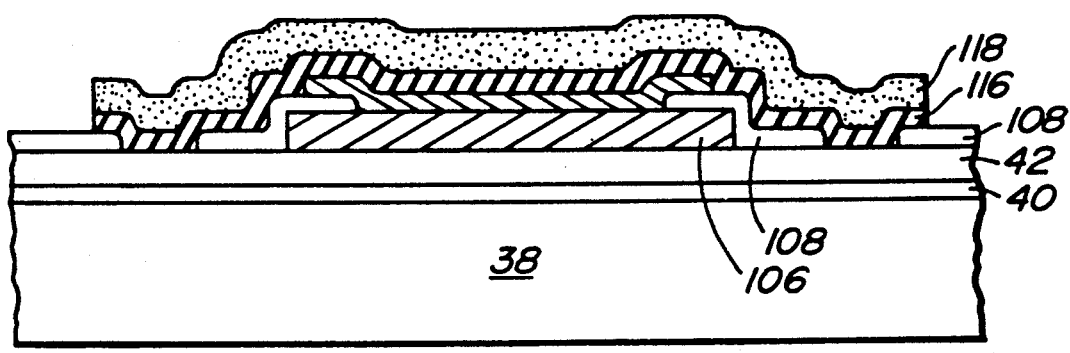
FIG._12F
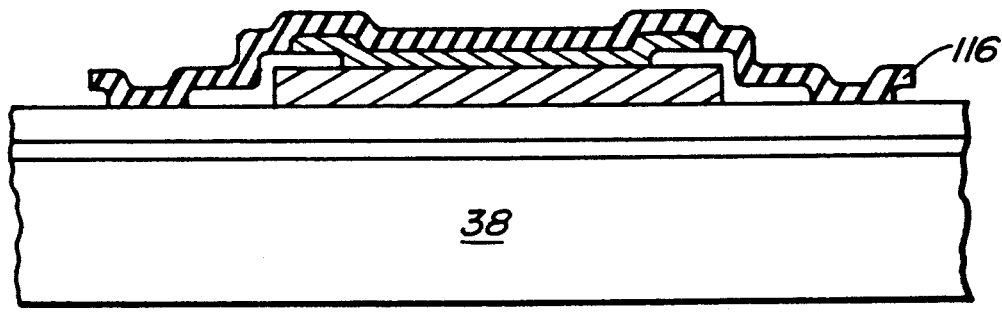
FIG._12G
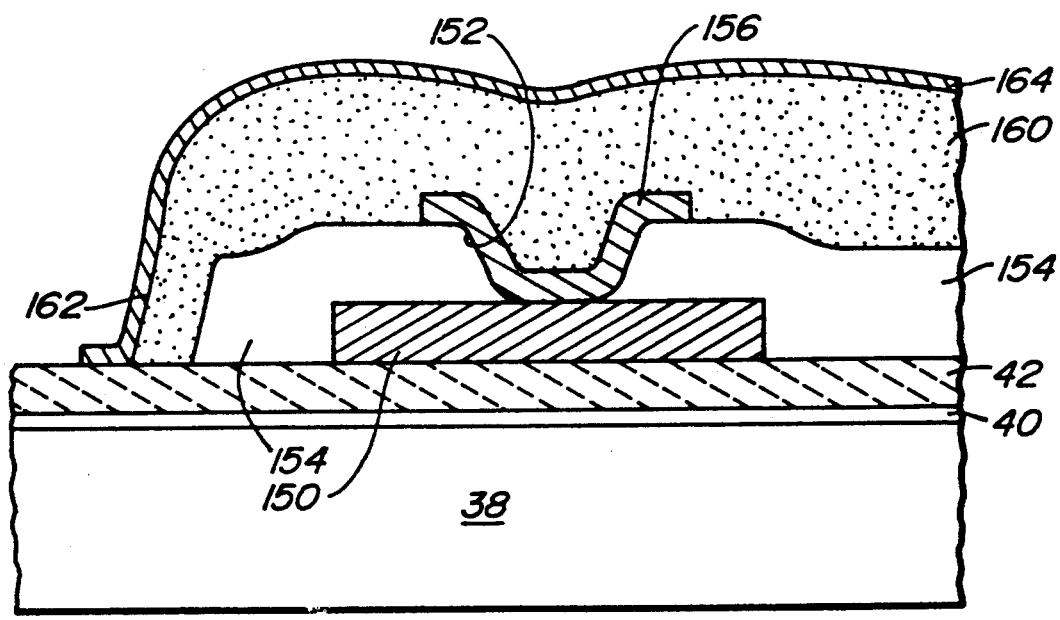
FIG._13

MICRO MOTORS AND METHOD FOR THEIR FABRICATION

This invention was made with Government support under Grant Contract No. CDR-86-14900, awarded by the National Science Foundation. The Government has certain rights in this invention.

This invention relates to micro motors which can be built of elements having dimensions in the order of one-tenth to one-thousand micrometers (one millionth of a meter) or greater and also to methods for making micro motors with a high degree of precision and reliability.

BACKGROUND OF THE INVENTION

Micromechanical structures, such as gears, pin joints, sliders, levers, and springs have been made and described previously in U.S. Pat. No. 4,740,410. Prior to this invention, however, no IC-processed micro motors have been fabricated that could be powered by electricity. With the development of such micro structures the importance of micro motors in the same size became apparent because of their many potential uses. Micro motors convert electric power into mechanical power and may be used to drive mechanical elements such as gears, cranks, and other mechanisms that have numerous applications in macroscopic assemblies.

An object of this invention is to provide both synchronous and asynchronous or stepper type micro motors having dimensions measured in the ranges afforded by present day microfabrication lithography, typically from tenths of micrometers to hundreds of micrometers.

Another object of the invention is to provide micro motors capable of converting electrical power into mechanical power to be positioned with high precision on a microscopic scale and to perform useful tasks.

A further object of this invention is to provide a method for making micro motors in a batch process using thin-film technology for the structural elements that incorporates steps for providing friction-reducing, wear-retarding, and reliability-improving characteristics. The method according to this invention makes possible the precise dimensional control of the micro motors despite their diminutive size.

Another object is to provide an improved method for making such micro motors by using thin-film materials such as Plasma-Enhanced-Chemical-Vapor-Deposited (PECVD) amorphous silicon thin films to protect metalization on the surface of the micro-motor chips from attach by etchants.

The invention has many potential applications in the micromechanical field which include providing mechanical power for miniature devices such as fans, centrifuges, movable mirrors, and geared mechanisms in addition to many other electromechanical system uses. The new micro motors of this invention can be batch-fabricated together with other mechanical or electromechanical devices and with electric circuits to form more complex and highly useful microminiature electromechanical systems.

SUMMARY OF THE INVENTION

In accordance with the principles of the present invention extremely small electrically driven micro motors are provided which may have diameters (across opposite stators) ranging from 60 to 140 microns (one millionth of a meter). In a further aspect of the invention, the micro motors are fabricated using a number of sequentially deposited films such as polycrystalline silicon (polysilicon), silicon nitride and silicon dioxide with the aid of a sacrificial layer or layers placed between two or more parts of the motor elements. The fabrication process of this invention includes a method using amorphous silicon or other suitable materials to protect the aluminum or other metalization (necessary to apply electrical signals to the motor) during the relatively long etch times needed to remove sacrificial layers that support the motor components during their manufacture.

Motors made in accordance with the invention may be either stepper or synchronous motors, each generally comprising a rotor surrounded by circumferentially spaced apart stator elements. Thus, circular motors can be designed for continuous motion (which results if the field moves continuously around the stator/rotor configuration), or for stepping motion (which is the response to step-wise changes in the field between the stators and rotors).

Linear motors (in which reciprocating motions along one direction may be either continuous or step-wise) can also be built using the principles of the invention. In fact, motion in arbitrary directions under electrical control is possible using cams and other mechanisms known in macroscopic electromechanical systems.

In general, each synchronous-type motor according to the invention is formed on a substrate provided with protective layers and including an upper layer that forms a ground plane. Attached to the ground plane is a fixed hub about which is a freely movable rotor having two or more radially extending arms with end portions that serve as poles. Surrounding the rotor in a circle and spaced slightly outwardly from the rotor poles is a stator comprised of a plurality of circumferentially spaced apart stator poles, each connected to a lead.

The present invention also includes several features which serve to reduce frictional effects that could otherwise greatly affect the operation of micro motors. Such features include the aforesaid ground plane whose function is to minimize the vertical field on the rotor when there is a voltage differential between it and the stator. The presence of a vertical field tends to bend the rotor poles downward and to increase the force on the rotor bearing which results in increased friction.

Further important features of the invention include: (1) a means for biasing the ground plane and thus the rotor relative to the stator thereby allowing the potential drop between the stator and rotor to be precisely controlled; (2) maintaining the stator and rotor co-planar (at the same height) for a synchronous motor, thereby reducing the vertical force and thus frictional force acting on the rotor when there is an electrical potential difference between stator and rotor; (3) providing silicon-nitride spacers at the edges of the rotors and stators and between the rotor and the hub which causes both friction reduction and a desired rotor protection from electrical breakdown of the gap between stator and rotor; and (4) providing either a silicon nitride coated hub or an axle made completely from silicon nitride to obtain friction reduction for the rotor.

For the stepping motor version, the invention provides additional features for reducing friction such as projections on the underside of the rotor which contact the substrate surface with minimal friction as the rotor turns.

A further reduction in rotor friction is provided by fabrication the rotor member to be slightly lower than the surrounding stator poles, which produces a vertical force component that tends to lift the rotor from its static supporting surface i.e the substrate.

Other objects, advantages and features of the invention will become apparent from the following detailed disclosure of embodiments thereof, presented in conjunction with the accompanying drawing.

BRIEF DESCRIPTION OF THE DRAWINGS

FIG. 1 is an SEM photograph showing a greatly enlarged view in perspective of a synchronous-type micro motor embodying the principles of the present invention.

FIG. 2 is a plan view of the synchronous-type micro motor shown in FIG. 1.

FIG. 2A is a timing diagram for the micro motor of FIG. 2.

FIG. 3 is a view in side elevation and in section of the micro motor shown in FIG. 1.

FIG. 3A is an electrical diagrammatic representation of capacitance characteristics for the micro motor of FIG. 1.

FIG. 4 is a plan view of the micro motor of FIG. 1 showing its metallized leads connected to bonding pads in a typical I-C circuit.

FIG. 5A is a view in elevation and in section of one form of the motor of FIG. 2.

FIG. 5B is a view in elevation and in section of a modified form of the motor of FIG. 2.

FIG. 5C is a view in elevation and in section of another modified form of the motor of FIG. 2.

FIGS. 6A to 6N are a series of views in cross section showing process steps for fabricating micro motors according to the present invention.

FIG. 7 is an SEM photograph showing a greatly enlarged view in perspective of a stepper-type motor embodying principles of the present invention.

FIG. 8 is a plan view of the micro motor shown in FIG. 7 as it appears in a micro-circuit device.

FIG. 9 is an enlarged and partially diagrammatic plan view of the motor of FIG. 7.

FIG. 9A is a timing diagram for the motor of FIG. 9.

FIG. 10 is a view in elevation and in section taken along line 10—10 of FIG. 9.

FIG. 10A is a further enlarged fragmentary and partially diagrammatic view in section showing a portion of the motor shown in FIG. 10.

FIGS. 11A–11C are a series of views in cross section showing steps of fabricating motors as shown in FIG. 7 according to the invention.

FIGS. 12A to 12G are a series of view in elevation and in section showing a metalization protection process according to the present invention.

FIG. 13 is a view in section showing an alternate form of metalization protection.

DETAILED DESCRIPTION OF SOME PREFERRED EMBODIMENTS

Micro-motor structures in various forms such as stepper motors or synchronous motors may be made with silicon planar technology and analogous processes that include some similar procedures for making micromechanical structures such as micrometer-scaled pin joints, gears, cranks and sliders as disclosed in our prior U.S. Pat. No. 4,740,410.

The fabrication process for micro motors according to the present invention also makes use of the high surface mobility of silicon atoms during CVD (chemical vapor deposition) growth to refill undercut regions where required. Movable rotors for the micro motors are built in a stationary position on sacrificial layers that are later removed to free the rotors from a stationary hub member so that rotation can take place. An important feature of this invention relates to structural elements and the processes for forming such elements that minimize frictional forces as well as electrical factors which could negatively affect motor life and performance.

Although planar techniques for making micro motors may employ polysilicon as the structural material and phosphosilicate glass (PSG) for the sacrificial layer, other materials compatible with the IC process can be substituted where appropriate.

With reference to the drawing, FIG. 1 shows a highly enlarged SEM photograph of a synchronous micro motor 20, embodying principles of the present invention and FIG. 2 is a somewhat diagrammatic plan view of the same motor. In general, the motor comprises a rotor 22 whose diameter may be around 60 microns which is supported for free rotation on a fixed hub 24. The rotor shown has four arms 26 spaced 90 degrees apart and extending radially from an annular center portion 28. The ends of the rotor arms are enlarged slightly and form poles 30 on the rotor. Surrounding the rotor in a circle and spaced radially a small gap distance 31 (e.g. 2–4 microns) from the rotor poles, are a series (e.g. 12) of circumferentially spaced apart fixed stator poles 32. Each stator pole has an arcuate shape and is separated from its adjacent poles by uniform spaces 33. Also each stator pole is connected to a conductive lead 36 which may extend to a terminal pad 37 for a typical motor drive integrated circuit device (See FIG. 4). In the embodiment shown, the diameter of the stator pole circle may be as small as 60 microns depending on the proposed use of the motor. Motors having rotors and stators with different numbers of poles and varying sizes can also be made within the scope of the invention.

When operated as a synchronous motor, the micro motor 20 may be electrically connected in various alternative ways. In the embodiment shown in FIG. 2, the motor 20 is connected for 3-phase operation. Thus, the adjacent stator poles 32 in the stator ring are designated successively as phase one, two and three, and there are four stator poles for each phase. These stator poles are connected via their respective leads to a suitable power source (not shown) furnished at their terminal poles. Located on the substrate below the rotor is a conductive ground plane which is connected to ground potential as indicated.

The timing diagram of FIG. 2A illustrates the electrical timing for typical 3-phase operation. As the different phases progressively rise to their maximum voltage, the active stator poles 32 react with the rotor poles 30 to create a force on each rotor arm and thus rotor torque, as indicated by the clockwise arrows in FIG. 2. Motors using the aforesaid 3-phase bias arrangement have been tested and observed using a video camera. Using a 200 V drive voltage, a rotor rotation of around 50 RPM was achieved, and at 350 v, the maximum rotation was about 500 RPM. Other bias arrangements for the stator and rotor may be used within the scope of the invention.

As shown in greater detail in FIG. 3, the motor 20 is formed and supported on a substrate 38 of a semiconductor material such as silicon having a uniform thickness. Covering the substrate is a layer of film 40 of thermally grown silicon dioxide having a thickness of around 0.3 micron which provides a first insulating layer. Extending over the layer 40 is another insulating layer 42 of silicon nitride having a somewhat greater thickness of around 1 micron. Located within the area defined by the stator poles 32 is a layer 44 of polysilicon material having a circular shape and a thickness of around 0.3 micron. This circular first layer 44 forms the ground plane whose surface is held at a constant voltage during operation of the motor. The ground plane extends around the hub, which is centrally located on it, and under the rotor. The function of this ground plane is to eliminate the vertical electric field on the rotor when there is a voltage differential between it and the stator. Owing to the high permittivities (dielectric constants) of the substrate materials such as silicon oxide and silicon nitride relative to that of air, and the small dimensions in the vertical direction, in the absence of a ground plane this vertical field can be larger than the lateral field from stator to rotor. Under such conditions, the vertical field would tend to bend the rotor poles downward and to increase the force on its bearing which would result in increased friction. If any charging of the rotor occurs with a ground plane present that is held at the same voltage as the rotor, there will be a repulsive force that will tend to bend the rotor away from the ground plane. This effect reduces the force on the bearing surfaces and simultaneously reduces the frictional drag on the rotor.

The ground plane layer 44 is designed so that it can be biased relative to the stator and it is in electrical contact with the rotor through the hub member 24 holding the rotor 22. Electrical biasing of the rotor can be advantageous. For example, it allows the potential drop between the stator and the rotor to be precisely controlled which is not possible when the rotor is electrically isolated and its voltage left to float. The ground-plane biasing feature adds a degree of freedom in providing a means to increase the voltage applied to the motor on start-up as compared to the voltage after it is free running.

As shown in the typical integrated circuit layout of FIG. 4, the micro motor 20 has its ground plane layer 44 connected to metalized pads 37A while the stator terminals 32 are each connected by conductive leads 36 to separate pads 37 for the 3-phase power source.

Turning to FIG. 3, the hub member 24 has an annular body 46 with vertically spaced apart integral upper and lower flanges 48 and 50. Between these flanges a cylindrical surface 52 of the body 46 serves as a bushing for the rotor. Thus, the annular center portion 28 of the rotor 22, located between the hub flanges 48 and 50, is rotatable around the bushing surface 52 and is spaced above the ground plane layer 44.

In the motor 20, the stator poles 32 are substantially co-planer with the rotor poles and are supported on upwardly extending end portions 34 of their respective lead members 36. As shown in the embodiment of FIGS. 1, 2 and 3, both the rotor and stator are built using the same layer of polysilicon. The lower flange 50 at the base of the hub 24 serves to maintain the rotor and stator poles in the completed motor at nearly the same elevation above the substrate 38 after the rotor is freed by etching. Keeping the rotor 22 and stator poles 32 co-planar (at the same height) helps to reduce the vertical force acting on the rotor when there is an electrical potential difference between the stator and the rotor, and this reduces the frictional force on the rotor.

In FIG. 5A, the basic structure of the motor 20 is shown as it appears in cross section with the rotor and stator components 22 and 32 in essentially the same plane and with the ground plane layer 44 under the rotor as shown in FIG. 3.

For some applications, frictional forces and certain electrical effects can negatively affect micro motor performance. Various arrangements for overcoming such problems are shown in FIGS. 5B and 5C.

As shown in FIG. 5B, silicon-nitride spacers 56 that have been deposited by low-pressure chemical-vapor deposition (LPCVD) are provided at the outer edges of the rotor poles 30 and the stator poles 32 for a motor 20A. These silicon-nitride spacers cause the horizontally-directed fields acting on the polysilicon surfaces between the rotors and the stators to be reduced because of the large relative permittivity (7.6) of silicon nitride compared to that of air (1). As a result, even if the electric field becomes sufficiently large to break down the air, the electric field acting on the polysilicon is reduced to only about 13% of this value.

Rotor bearing surfaces that are in contact with the hub may also coated with silicon nitride. Thus, motor 20A also has a silicon-nitride spacer 58 provided on the surface of the annular center portion 28 of the rotor around the hub which functions as a solid lubricant because the coefficient of friction between silicon and silicon nitride is smaller than that between silicon and silicon. This arrangement will not, however, permit the rotor to be in direct electrical contact with the ground plane (as in the motor shown in FIG. 3) because the silicon-nitride layer is a good electrical insulator. However, the capacitive coupling between the ground plane and the rotor is much larger than the coupling between the rotor and the stator because of the greater area overlap between the ground plane and the rotor (as shown in FIG. 3A). The larger capacitance is between the ground plane and the rotor, and the smaller capacitance is between the rotor and the stator. When a potential difference exists between the ground plane and the stator, most of the potential will drop between the rotor and the stator. As a result, both friction reduction and rotor bias can still be achieved in this nitride-coated hub structure.

In the embodiment shown in FIG. 5C, a modified micro motor 20B is provided with a hub member 24b whose outer surface, including at least its lower flange and central cylindrical portion is coated by a layer 59 of silicon nitride using a deposition step in the fabrication process. This arrangement affords similar friction reduction and some electrical insulation as provided by the embodiment of FIG. 5B.

It is also possible to form the hub axle completely from silicon nitride and thereby to obtain the same friction reduction. Process details for this feature are contained in the section below covering fabrication procedures for the stepping motor.

The process for fabricating synchronous type micro motors 20, according to the invention, may be described by reference to FIGS. 6A–6N. A substrate or base 38 of silicon or some other suitable material is first cleaned and then provided with successive insulating layers: the layer as film 40 of thermally grown silicon dioxide (300 nm) and the 1 micron overlay layer 42 of silicon nitride. Then, a first layer 44 of polysilicon (300 nm) is deposited and patterned by masking to provide the ground plane for the rotor 22. In the next step (FIG. 16B), a 2.2 micron layer of phosphosilicate glass (PSG) is deposited to become a sacrificial layer 74. Masking is utilized later on to provide the latter sacrificial layer with an undercut anchor opening 90 (FIG. 6H) of a predetermined geometric shape to form the rotor and hub configurations. Next, a second layer 80 of polysilicon (1.5 microns) is deposited (FIG. 6C), and thereafter patterned by masking to form both the stator and rotor (FIG. 6D). A masking step follows to expose the PSG layer 74 at the central part of the rotor. A buffered HF etch step then creates the undercut anchor opening 70 (FIG. 6H) for the hub. This is followed by a deposition of a second layer 94 (FIG. 6F) of sacrificial PSG having a thickness of around 700 nm to refill the rotor undercut. A hub contact hole to the ground plane is then opened, followed by the deposition and patterning of a third layer 102 of polysilicon to a thickness of around 1.5 microns to form the upper and lower flanges 48, 50 of the hub member 24. After proper metalization steps (including protection steps) (FIGS. 6J-6M) a sacrificial PSG etch in buffered HF finishes the process.

The following process description with reference to FIGS. 6A to 6N includes detailed steps for making the three different forms of motor structures shown in FIGS. 5A, 5B, and 5C. Steps of a specially designed metalization protection method, as shown in FIGS. 12A to 12G, are also used in fabricating the motor 20. However, this metalization protection method, which will be described below in detail is not limited in application only to the motor process. The method can be used in any process that requires protection of metal during a prolonged etch in HF-based acid. Since the protection method employs amorphous silicon, no new contamination problems are introduced when it is adopted in a standard silicon IC process. Another advantage of this protection method is that it allows conventional aluminum metalization which facilitate building integrated electromechanical systems. Although it is still possible to make micro-motors without the designed metalization protection, problems of low yield can arise due to metalization failure.

Because the three different motor structures shown in FIG. 5A, 5B and 5C have different features, there are different processing steps to create each feature. The following will describe the process for the embodiment of FIG. 5A, and then the extra steps that are needed to make the motors in FIGS. 5B and 5C.

The motor process starts with n-type, 4" silicon which forms the base 38 wafers. These wafers are first cleaned in "piranha" (5:1 H2SO4:H2O2) at 120 degrees C. for more than 10 minutes, and rinsed in deionized water. A 300 nm thick wet thermal oxide layer to form the layer or film 40 is then grown on the starting wafers at 1000 degrees C. A 1 micron thick Low Pressure Chemical Vapor deposited (LPCVD) low stress silicon nitride layer to provide layer 42 is then deposited at 835 degrees C. with SiH2Cl2:NH3=75:15 standard cubic centimeter (sccm) gas flow rates and at a base pressure of 300 mTorr. A 300 nm layer of LPCVD polysilicon is then deposited at 650 degree C. with SiH4:PH3=120:1 (sccm). This polysilicon layer is to provide the ground plane layer 44 for the motor. The ground plane is defined by photolithography using a Kodak 820 positive photoresist mask 72. The subsequent reactive-ion-etching (RIE) of the polysilicon is done with a plasma consisting of carbon tetrachloride (CCl4) in an amount of 130 sccm, 130 sccm helium, and 15 sccm oxygen at a pressure of 280 mTorr, and a power of 300 W. The cross section after this RIE etch is FIG. 6A. The photoresist mask 72 is then removed by photoresist ashing, using oxygen plasma at 300 mTorr, 500 W, and 10 minute. The wafers are then cleaned again in piranha and deionized water. A 2.2 micron phosphorus-doped low-temperature-oxide (LTO), also called phosphosilicate glass (PSG), is deposited at 450 degrees Centigrade to form the first sacrificial PSG layer 74. The PSG layer 74 is deposited with SiH4:O2:PH3=60:90:10 (sccm) and at a base pressure of 300 mTorr. Photolithography of a second photoresist mask 76 is then used to define outer anchor-openings 78 for the stator. The oxide in the openings is removed by oxide RIE etching in CHF3 plasma with power of 850 W for 2.5 minutes. FIG. 6B shows the cross section after this step. Photoresist 76 is then again removed by O2 oxygen plasma. Another piranha and deionized water clean makes the wafers ready for a second layer polysilicon deposition 80. Here, one additional native oxide etch step can be added in before depositing polysilicon to improve adhesion between polysilicon and silicon nitride. Without etching away the native oxide, there will be polysilicon-oxide-nitride contact. Such composite could fail during long HF etch because the whole polysilicon could be separated from the silicon nitride when the oxide is etched away by the HF. Since most of the wafer is covered by PSG except the openings, the conventional diluted HF dip is undesired because the etching rate of PSG in HF is large and the etching is highly non-uniform. Here, a new but effective, experimentally proved, short CHF3 plasma etch is provided. A 5 second etch of the wafer in CHF3 plasma (same as the PSG RIE plasma etch) with a power of 700 W etches away the native oxide on the silicon nitride and still keeps the surface smoothness of the PSG. Immediately after the short native oxide plasma etch, the wafers then are deposited with 1.5 micron thick second layer 80 of polysilicon for both the rotor and stators. The deposition condition is the same as for the first layer of polysilicon except that a longer, hence thicker, deposition is required. After the deposition of the second polysilicon, the cross section looks like that in FIG. 6C. To define the stator and rotor elements for the embodiment of FIG. 5A, a photoresist layer 82 is formed on the second polysilicon layer 80 and then etched as previously described, as shown in FIG. 6D.

In the modified process to form the motor embodiment of FIG. 5B, as shown in FIGS. 6E-6G a 100 nm wet thermal oxide layer 84 as shown in FIGS. 6E-6G is grown on the second layer 80 of polysilicon at 900 degrees Centigrade. Photolithography, using a resist layer 86 then is done to define the regions of rotor and stators. For the motors with silicon nitride spacers, an extra short etch in 5:1 buffered HF for one minute is needed to etch away the wet thermal oxide in the openings. The second layer of polysilicon 80 then is patterned again in CCl4 RIE plasma. FIG. 6E shows this intermediate step adapted for the steps for making silicon nitride spacers 56 (FIG. 5B). The photoresist mask 86 now is removed again using the O2 oxygen plasma with 500 W for 10 minutes. Wafers are cleaned with piranha and deionized water. In order to make nitride spacers, a 340 nm thick LPCVD silicon nitride layer 88 as shown in FIG. 6F is deposited on wafers designed for motors in FIG. 5B. The silicon nitride deposition conditions are 800 degrees C., SiCl2H2:NH3=25:75 (sccm), and a base pressure of 300 mTorr. FIG. 6F shows the cross section after this step. Note that silicon nitride is in direct contact with the second layer 80 of polysilicon only at vertical walls on the edges of the openings. An unisotropic silicon nitride RIE plasma etch then etches away all the nitride except those on the vertical walls which thus form the spacers 56 and 58 of the motor in FIG. 5B. The recipe of this nitride RIE plasma is the same as the polysilicon RIE plasma. The cross section after this nitride RIE plasma etch is shown in FIG. 6G.

After the formation of the silicon nitride, the rest of the process for the motor FIG. 5B is the same as that for FIG. 5A. In the following, therefore, only the cross sections for FIG. 5A will be given to explain the process. Photolithography for hub openings then follows. A two minute etch of the PSG in 5:1 BHF also creates the undercut anchor opening 90 of the rotor so that the designed hub can have flanges to hold the rotor (see FIG. 6H). Oxygen plasma is used to remove a photoresist layer 92 used to form the hub opening. Wafers are cleaned again in piranha and deionized water. The 700 nm thick second sacrificial PSG layer 94 is then deposited to cover all the surfaces including the undercut of the rotor (FIG. 6I).

Now, in order to make a nitride-coated hub, a 230 nm silicon nitride layer 96 is deposited immediately after the PSG deposition. This step is not necessary for motors without a nitride-coated hub. However, after nitride deposition, the cross section is shown in FIG. 6J.

Photolithography using a resist layer 98 for the hub anchor opening 100 is then done. The opening 100 is at the center of the rotor and is opened by a time-controlled CHF3 RIE plasma etch with 850 W. For the nitride-coated hub structure, some extra time is needed to etch through nitride besides PSG. FIG. 6K, therefore, shows the position of the hub opening and the exposed first layer polysilicon ground plane layer 44. Wafers then are cleaned by removing the photoresist in oxygen plasma, cleaning in hot piranha, and rinsing in deionized water. After a short native oxide etch in CHF3 plasma, all wafers are deposited with a third layer 102 of polysilicon for the hub. This hub polysilicon is also 1.5 micron thick and heavily phosphorus doped. FIG. 6L shows the cross section. A photolithography step using a resist layer 104 then defines the hub. Polysilicon RIE etch in CCl4 plasma then patterns the hub. Once again, in the case of a nitride-coated hub, this RIE step takes longer to etch through the nitride. FIG. 6M shows the cross section after this polysilicon RIE step. A final photoresist removal in oxygen plasma then completes the process for the motor part. FIG. 6N after the sacrificial PSG layers 74 and 94 have been etched away, then identifies itself with FIG. 5A. Of course, with the nitride spacer process or nitride-coated hub process, the final product will be FIGS. 5B and 5C respectively.

In order to run the motors of FIGS. 5A, 5B, and 5C, metalization must be provided, and conventional aluminum metalization may be used as described, preferably in conjunction with the metalization protection method as shown in FIGS. 12A– 12G. Metalization for the motor such as shown in FIG. 4, starts with polysilicon pads 106 on top of the low-stress nitride 42 and polysilicon pads covered by PSG 108 (FIG. 12A). The first photolithography then defines the openings 110 of the contact holes, followed by a PSG etch in 5:1 BHF. After the photoresist is removed in oxygen plasma, the cross section looks like FIG. 12B. A 700 nm thick aluminum layer 112 with 1% Si then is plasma sputtered onto the wafers. Photolithography then defines the aluminum bonding pads and an aluminum etchant completes the pads. After photoresist removal, the bonding pads 12 looks like that in FIG. 12C.

So far, the above describes a conventional standard aluminum metalization that is widely used in IC industry. However, for micro-motors according to the present invention, this is not the last step. A long HF-based etch will be the last step for micro-motor process. If made without protection, the aluminum pads will be attacked by the HF-based etchant and low yield will be the result.

In the following, a new method is provided to protect the metalization that is on the wafer. This method is not limited to aluminum metalization and the protecting layer is not limited to the amorphous silicon. However, since this protection is applicable for aluminum metalization and there are no contamination problems when using amorphous silicon, this method may also be very useful to help in combining integrated circuits and micromechanical systems.

FIG. 12D illustrates this protection method. First, trenches 114 in the PSG layer 108 down to the silicon nitride are opened by a series of processing steps including photolithography, PSG etch in BHF, and photoresist removal. The two trenches 114 in FIG. 12D are actually from a cut cross section in view of a guard ring (not shown) that surrounds a metal pad. The function of the guard ring is used to isolate or separate the pad from any oxide connection to the will-be-etched region. Then a thin plasma-enhanced CVD (PECVD) amorphous silicon layer protecting 116 (typically 300–500 nm) is deposited to completely seal the pad from outside (See FIG. 12E). The deposition conditions for the PECVD amorphous silicon are 260 degrees Cm SiH4 plasma, 5 W, and at a base pressure of 600 mTorr. Since the sacrificial layer 108 in our case is made of PSG and its etchant is HF-based acids, amorphous silicon is chosen as the protecting layer 116 because of its inertness to the HF-based etchants like BHF or high-concentrated HF. After the amorphous silicon deposition, steps of photolithography using a resist layer 118 and amorphous silicon RIE etch, then expose the will-be-etched region but leave the metal pad 112 sealed. As shown in FIG. 12F, the photoresist 118 can actually be left on top of the amorphous silicon because it also protects layers that are underneath it. Structures like FIG. 12F can last very long in HF-based acids without damaging the metal pad. The photoresist can later be removed with oxygen plasma. The amorphous silicon then stays with the metal, which means the amorphous silicon serves as a protecting layer even after the motor-freeing step. The only concern, however, is that proper thickness must be chosen so that further probing and bonding to the metal pad are easy. For example, if very thick amorphous silicon is used (say, 2 microns), it will be hard to probe through it, not mentioning bonding, and reach the metal pad. However, a layer of 0.5 micron amorphous silicon will achieve the protection purpose but cause no problems for probing and bonding the pads. To conclude, this method is not limited to amorphous silicon and aluminum metalization only. Many sets of possible combinations are possible. For example, PECVD silicon nitride as the protecting layer and tungsten as the metalization material. The basic rules are simple that the protecting layer must be able to resist the solvent of the sacrificial layer and it's thickness should be chosen for easy probing and bonding.

Stepping motors embodying principles of the invention can be utilized for micropositioning and have desired characteristics such as large starting torque, small frictional force and fine angle resolution. With reference to FIGS. 7 and 9, an example of a stepping motor 120 is shown having a rotor with 8 poles 124 within a stator, having 6 poles 126. The stator poles, as with those of the motor 20, are connected to metallized lead members 128 on the substrate surface which extend to terminal pads 130 of typical I-C structures, as shown in FIG. 8. Again it is apparent that different stepper motor configurations could be devised within the scope of the invention.

As shown in FIG. 10, the motor 120 is supported on a substrate 38 covered with insulating layers 40 and 42 of silicon dioxide and silicon nitride as with the motor 20. Here, a central hub member 132 is provided which is also preferably formed entirely from silicon nitride. This hub member has a lower cylindrical portion 134 fixed to the upper silicon nitride layer 42 and an upper radially extending flange 136 that retains the rotor 122. The rotor, of polysilicon material, has a circular body with radially extending and circumferentially spaced apart pole portions 124 (see FIG. 9). The stator poles 126 are spaced along a circle whose diameter is only slightly greater than that between opposite rotor poles so that the gap 138 is formed between rotor and stator poles of around 2 microns.

For stepping motors, starting torque is a periodic function of the relative position of rotor and stator. In the present invention the geometries (as shown in FIG. 8) of the rotor and the stator poles have been designed so that as stepping of the voltage from pole to pole occurs, there is partial alignment of the active pole-pair immediately after switching. This helps to increase the size of the torque on the rotor.

FIG. 9A shows a timing diagram for the relative geometric orientation of rotor and stator poles which together illustrate the bias and phasing scheme for the stepping motor 120.

As shown in greater detail in FIG. 10A, a series of hemispherical projections 140 are formed during the fabrication of the rotor 122 to extend below the rotor's undersurface 141 at spaced apart locations. These projections support the rotor on the surface of the substrate layer 42 as it rotates but provide only a small area contact with minimal friction. To make the projecting circular holes during the motor fabrication process, they are patterned in the resist covering a sacrificial-oxide layer 142 and this layer is then isotropically etched before depositing a polysilicon layer 144 to form the rotor (see FIGS. 11A–11C). The extended projection 140 of polysilicon reduce friction between the two surfaces 42 and 141. A different number of projections 140 or a continuous projecting ring on the underside of the rotor may be used to reduce friction, if desired.

To reduce any vertical force tending to pull downward on the rotor, the rotor 122 is made so that it is somewhat closer to the substrate surface than are the stator poles 126 that surround the rotor as also illustrated in FIG. 10A. By designing the motors so that the plane of the rotor is slightly lower (typically 0.5 um) than the plane of the stator, the electrical field will have a component perpendicular to the substrate which will give rise to a force that tends to lift the rotor from this surface and thus reduce friction. The purpose of this levitation force is not to overcome gravitational force (the rotor has a mass measured in tens of nanograms), but rather to overcome electrical attraction of the rotor to the substrate.

Micro stepping motors may be made as shown in FIGS. 11A, 11B and 11C using a process similar to that described for making pin joints in our previous U.S. Pat. No. 4,740,410. As with the process for synchronous motors, a substrate 38 is first provided with insulating layers 40 and 42 of silicon dioxide and silicon nitride. As shown in FIG. 11A, an initial sacrificial layer 142 of PSG is first deposited in a predetermined pattern having a thickness of around 2.5 microns. A first and only layer 144 of polysilicon is now deposited which is patterned to form the stator and rotor elements 122 and 126. As previously described, the rotor is formed with a series of spaced apart hemispherical projections 140. These projections are formed by isotropically etching the PSG to a predetermined depth before the polysilicon deposition. A second sacrificial PSG layer 146 is now applied, as shown in FIG. 11B, which covers the polysilicon layer and provides an opening 148 for the central hub member 132. Now, with suitable masking in place, the hub member including its upper flange, is formed by a deposition preferably of silicon nitride. Thereafter, a pattern and etch procedure is performed to define the hub flange 136 followed by another etch procedure to remove the sacrificial layers 142 and 146 which free the rotor for movement about the hub member 132. With the rotor of the stepping motor free to rotate, pulse energy applied to the terminal pads 130 will cause the rotor to rotate in steps at the desired speed to a preselected position.

In the micro motor embodiments shown in FIGS. 7 and 8, aluminum or gold is used for the bonding pads, jumpers, and surface leads while phosphosilicate glass is used for isolation layers. These layers have to be protected during the final BHF etch step. For a typical surface lead 150, as shown in FIG. 13, a trench 152 in the surrounding PSG layer 154 is first formed by a lithographic step. Within the trench is an aluminum contact 156 for the lead 150. Photoresist 160 is then put on and patterned. Then a hardbake step reflows and hardens this photoresist layer. The reflowed edge of the photoresist forms a tapered edge 162. Finally, a gold layer 164 is deposited on top of the photoresist layer 160 and is roughened with oxygen plasma. The gold film sticks to the roughened photoresist quite well and acts as a BHF diffusion barrier. The patterned gold film 164 extends over the trench so acid will be isolated from the photoresist. After releasing the rotors in the aforesaid motor process, the gold film is removed by gold etchant, and the photoresist is removed by oxygen plasma.

To those skilled in the art to which this invention relates, many changes in construction and widely differing embodiments and applications of the invention will suggest themselves from the spirit and scope of the invention. The disclosure and the descriptions herein are purely illustrative and are not intended to be in any sense limiting.

What is claimed is:

1. A microminiature electric motor comprising:
   a substrate base covered with a first layer of silicon dioxide and a second layer of silicon nitride;
   a hub member fixed to and extending above said base;
   a rotor having a plurality of poles and rotatable in a circular path on said hub member;
   a fixed stator including a series of poles surrounding the circular path of said rotor poles, said hub member, said rotor and said stator all being comprised of sequentially deposited and etched film materials on said substrate base; and a plurality of conductive lead members on said base connected to said stator poles and adapted for connection with a power source.

2. The electric motor as described in claim 1 including a first layer of polysilicon on said silicon nitride layer located under said rotor and forming a ground plane for said motor.

3. The electric motor as described in claim 2 wherein said stator poles extend upwardly from ends of said lead members and are spaced above said ground plane.

4. The electric motor as described in claim 3 wherein said stator poles are spaced outwardly from and are substantially co-planar with said rotor poles.

5. The electric motor as described in claim 4 in which silicon nitride material forms spacer means on an outer surface of said stator poles and said rotor poles.

6. The electric motor as described in claim 2 wherein a second layer of polysilicon forms a substrate of said rotor, said stator and said lead members, and a third layer of polysilicon providing an upper flange on said hub member.

7. A microminiature electric motor comprising:
a substrate base;
a hub member fixed to said base;
a rotor having a plurality of poles and rotatable in a circular path on said hub member; and
a fixed stator means including a series of poles surrounding the circular path of said rotor poles, the diameter of said stator means between opposite stator poles being from 60 to 140 microns.

8. A microminiature electric motor comprising:
a substrate base;
a hub member fixed to and extending above said base;
a rotor having a plurality of poles and rotatable in a circular path on said hub member, said rotor being a generally circular planar member with an upper surface and a lower surface spaced above said base; and a plurality of circumferentially spaced apart projections on said lower rotor surface for supporting said rotor on said substrate base as it rotates;
a fixed stator including a series of poles surrounding the circular path of and spaced from said rotor poles, said hub member, said rotor and said stator all being comprised of sequentially deposited and etched film materials on said substrate base; and
a plurality of conductive lead members on said base connected to said stator poles and adapted for connection with a power source.

9. A microminiature electric motor comprising:
a substrate base;
a hub member fixed to and extending above said base;
a rotor having a plurality of poles and rotatable in a circular path on said hub member, said rotor being a generally circular member with peripherally spaced apart poles;
a fixed stator including a series of poles surrounding the circular path of and spaced from said rotor poles, said hub member, said rotor and said stator all being comprised of sequentially deposited and etched film materials on said substrate base;
said rotor poles located in a plane lower than said stator poles and thus closer to said substrate base thereby creating a force component which tends to lift said rotor away from said substrate base to reduce friction on said rotor; and
a plurality of conductive lead members on said base connected to said stator poles and adapted for connection with a power source.

10. A microminiature electric motor comprising:
a substrate base;
a hub member fixed to and extending above said base, said hub member being made entirely of silicon nitride material;
a rotor having a plurality of poles and rotatable in a circular path on said hub member;
a fixed stator including a series of poles surrounding the circular path of said rotor poles, said hub member, said rotor and said stator all being comprised of sequentially deposited and etched film materials on said substrate base; and
a plurality of conductive lead members on said base connected to said stator poles and adapted for connection with a power source.

* * * * *

UNITED STATES PATENT AND TRADEMARK OFFICE
CERTIFICATE OF CORRECTION

PATENT NO. : 5,252,881
DATED : October 12, 1993
INVENTOR(S) : Richard S. Muller, et al It is certified that error appears in the above-indentified patent and that said Letters Patent is hereby corrected as shown below:

Drawings, sheet 2, Fig. 3, the upwardly extending end portions of the stator pole leads should be referenced by number 34, and the rotor should be referenced by number 22.
Drawings, sheet 2, Fig. 4, a stator pole should be referenced by number 32 and a lead should be referenced by number 36.
In column 1, line 51 replace "attach" with --attack--.
In column 3, line 2 insert --of-- after "fabrication".
In column 4, line 58 replace "react" with --interact--.
In column 5, line 2 replace "of" with --or--.
In column 5, line 58 replace "co-planer" with --co-planar--.
In column 6, line 65 replace "as" with --or--.
In column 7, line 1 replace "16B" with --6B--.
In column 7, line 12 replace "70" with --90--.
In column 7, line 14 replace "6F" with --6l--.
In column 7, line 18 after "120" insert --(Fig. 6L)--.
In column 7, line 50 replace "which forms the base 38 wafers" with --wafers which form the base 38--.

Signed and Sealed this

Sixth Day of September, 1994

Attest:

BRUCE LEHMAN

Attesting Officer     *Commissioner of Patents and Trademarks*

UNITED STATES PATENT AND TRADEMARK OFFICE
CERTIFICATE OF CORRECTION

PATENT NO. : 5,252,881
DATED : October 12, 1993
INVENTOR(S) : Richard S. Muller, et al It is certified that error appears in the above-indentified patent and that said Letters Patent is hereby corrected as shown below:

In column 8, lines 17 and 61 delete "O2".
In column 8, line 49 delete "as shown in FIGS. 6E-6G"
In column 9, line 4 replace "unisotropic" with --anisotropic--.
In column 10, line 2 replace "etchant" with --etch--.
In column 10, line 4 replace "12" with --112--.
In column 10, line 32 replace "layer protecting" with --protecting layer--.
In column 10, line 35 replace "Cm" with --C--.
In column 10, line 66 replace "simple" with --simply--.
In column 10, line 67 replace "it's" with --its--.
In column 11, line 17 after "20" insert --of Fig. 3--.
In column 11, lines 52-53 replace "projection" with --projections--.

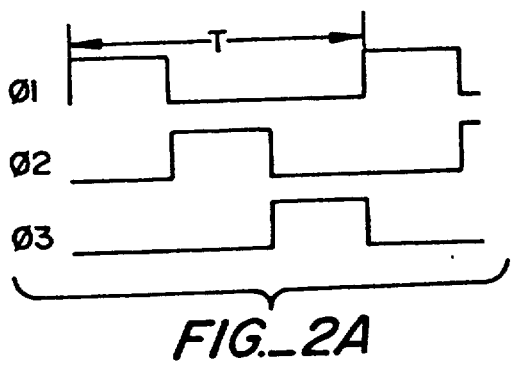
FIG._2A
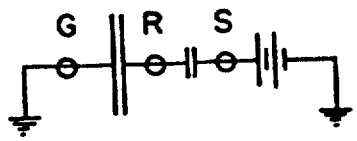
FIG._3A
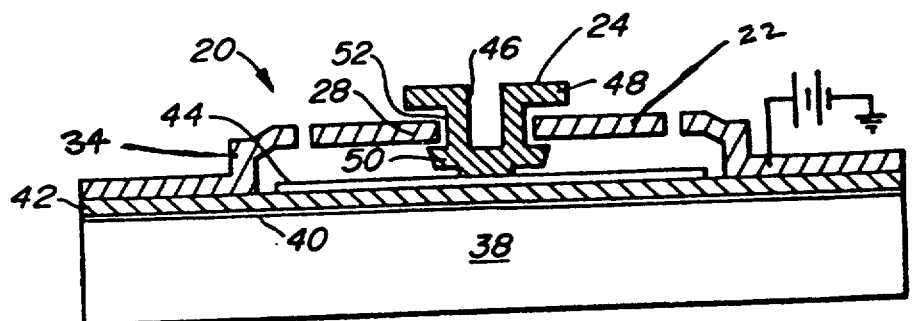
FIG._3
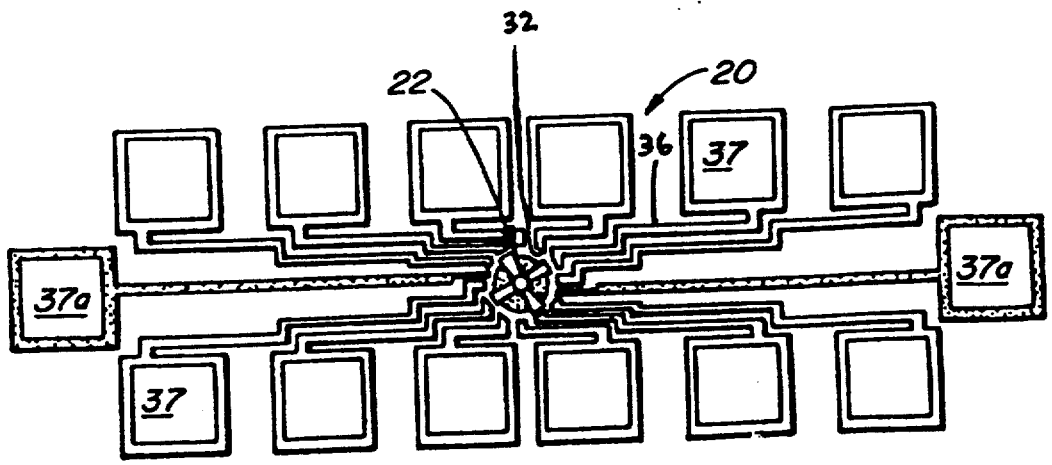
FIG._4